United States Patent
Carboni (10) Patent No.: US 10,983,417 B2
(45) Date of Patent: Apr. 20, 2021

(54) DEVICE FOR PHOTOGRAPHING OBJECTS

(71) Applicant: DOMA AUTOMATION S.R.L., Arezzo (IT)

(72) Inventor: Marco Carboni, Arezzo (IT)

(73) Assignee: DOMA AUTOMATION S.R.L., Arezzo (IT)

( * ) Notice: Subject to any disclaimer, the term of this patent is extended or adjusted under 35 U.S.C. 154(b) by 15 days.

(21) Appl. No.: 16/487,435

(22) PCT Filed: Sep. 1, 2017

(86) PCT No.: PCT/IB2017/001080
§ 371 (c)(1),
(2) Date: Aug. 21, 2019

(87) PCT Pub. No.: WO2018/158608
PCT Pub. Date: Sep. 7, 2018

(65) Prior Publication Data
US 2020/0064713 A1 Feb. 27, 2020

(30) Foreign Application Priority Data
Feb. 28, 2017 (IT) .......................... 102017000022525

(51) Int. Cl.
*G03B 17/02* (2021.01)
*G02B 7/04* (2021.01)

(52) U.S. Cl.
CPC .............. *G03B 17/02* (2013.01); *G02B 7/04* (2013.01)

(58) Field of Classification Search
USPC ............................................... 396/1, 5, 535
See application file for complete search history.

(56) References Cited

U.S. PATENT DOCUMENTS

| | | | | |
|---|---|---|---|---|
| 6,106,124 A * | 8/2000 | Tarsia | ................... | G06T 1/0007 362/11 |
| 6,343,184 B1 * | 1/2002 | Huebner | ................ | G03B 15/06 348/E5.037 |
| 6,969,033 B2 * | 11/2005 | van der Linden | ..... | F16M 11/10 248/177.1 |
| 7,440,685 B2 * | 10/2008 | Weng | ................... | F16M 11/046 396/419 |
| 7,855,732 B2 * | 12/2010 | Williams | ............. | G06K 9/2027 348/211.7 |
| 8,301,022 B1 * | 10/2012 | McGuire | ................ | G03B 15/06 396/2 |
| 8,462,206 B1 * | 6/2013 | McGuire | ................ | G03B 37/02 348/135 |
| 9,625,794 B2 * | 4/2017 | Bochenek | .............. | G03B 17/56 |
| 2001/0041064 A1 * | 11/2001 | Huebner | ................ | G03B 15/06 396/3 |
| 2008/0056569 A1 * | 3/2008 | Williams | ........... | H04N 5/23216 382/173 |
| 2011/0069880 A1 * | 3/2011 | Sergieiev | ............... | F16M 11/10 382/154 |
| 2012/0177350 A1 * | 7/2012 | Jancourtz | ............... | F16M 11/08 396/5 |

* cited by examiner

*Primary Examiner* — Rodney E Fuller
(74) *Attorney, Agent, or Firm* — Patshegen IP LLC; Moshe Pinchas (57) ABSTRACT

Device for photographing objects comprising an optically opaque, box-like body housing a sample-holder disc rotating about a vertical axis, and suspended from a base to which it is rotationally coupled according to a horizontal diameter axis through two rotary loops; inside the box-like body there are lighting fixtures.

10 Claims, 6 Drawing Sheets

DEVICE FOR PHOTOGRAPHING OBJECTS

TECHNICAL FIELD

The present invention belongs to the field of devices for automatically photographing objects, in particular small items such as watches or jewellery.

More specifically, the present invention relates to a device capable of capturing the sample to be photographed from any angle, while, at the same time, managing the illumination regardless of the light conditions of the room where the device is located.

In particular, the present invention relates to a device integrated with a digital-type capturing device and an automatic image processor, such as a computer with a software for the processing of digital images. The object of this patent application includes the object or sample to be photographed in its interior, creates the desired lighting conditions, and moves the capturing device and the sample reciprocally, so as to capture it from every angle.

STATE OF THE ART

The known devices, also called portable photographic studios, have been developed to automatically capture images of objects contained within them, simulating the lighting conditions of a photo studio. These devices are used, for example, to capture images of objects useful for creating catalogues, or for animations that are nowadays very sought-after to show objects on websites; these devices are also used to easily capture high resolution images.

In particular, known devices have the form of volumes marked by walls, but are not completely closed; examples are shown in U.S. Pat. No. 2,967,455 A, FR 2637391 A1, FR 2946158 A1.

Also known are fully closed devices, such as those shown in U.S. Pat. No. 4,292,662 A.

An obvious advantage of devices of the closed type is that of avoiding reflections from the surrounding environment and, in general, in all these devices, it is possible to easily control the illumination of the sample to be photographed, so as to avoid unwanted shadows and/or reflexes; however, they are devices of the essentially static type that do not allow the sample and the capture device to move reciprocally.

With the spread of websites, the need arose to create, in a quick and simple manner, a series of images of the same object to be put online and to allow the website user to virtually rotate the object so that it can be observed in every part and under different angles. Devices have been developed and fine-tuned to facilitate and make the shooting of the same object from many different angles more convenient and practical, while controlling at the same time the lighting conditions.

An example is contained in US 2016/0202599 A1 which describes an apparatus comprising an outer casing, shaped like a horizontal axis cylinder, and an internal element supporting the sample to be photographed. The inner support element of the sample consists of a table rotating about a vertical axis.

From the upper portion of the lateral surface of the cylindrical casing suitable means for anchoring the capturing device, such as a camera or a camcorder, protrude.

The lower part of the cylindrical lateral surface of the outer casing slidingly lies on a base cradle and this allows a partial rotation of the cylinder about a horizontal axis substantially coincident with the axis of the cylindrical casing; the angle of possible rotation of the housing about its horizontal axis is limited as the camera anchoring means interfere with the base cradle.

Both the internal rotating table supports and the two vertical disc-shaped elements forming the two bases of the cylindrical casing are static and integral with the base cradle.

For this reason, said device does not allow to capture the sample at any possible angle, and in particular it is impossible to shoot from bottom to top; it is also necessary that the specimen is placed vertically on the support plate in order to be captured both from the top and laterally.

Vertically placing small objects without bases, such as rings or jewellery, is often very hard and makes it necessary to use glue or other locking systems; the same problem occurs, accentuated, in the case of non-rigid samples, such as necklaces, watches, or the like. This limit is very unpleasant, both because it forces the operator to perform complicated operations requiring time and some ability, and because the locking means remain visible during shooting.

It should also be noticed that the cylindrical configuration of the casing of the device disclosed in US 2016/0202599 A1 cannot guarantee a perfectly even inner distribution of light because the lighting fixtures are placed only on the inner lateral surface of the cylinder and not on the base surfaces.

Therefore, it is necessary to have an automatic device allowing to take photographs of samples made of objects to be captured at any angle in a quick and easy way, carefully checking the lighting conditions while avoiding the need to use means or accessory systems to keep the samples in place.

OBJECTS AND SUMMARY OF THE INVENTION

A first object of the present invention is therefore to provide a device for photographing objects under each angle in a simple and quick way, without the need to block the samples in a predetermined position.

A non-secondary object of the present invention is to provide a device for photographing objects by completely controlling the lighting conditions of the sample, being able to eliminate shadows altogether or creating them at will.

Another object of the present invention is to provide a device for photographing objects in an automatic manner that is at the same time easy to use, so as to provide the added benefit of preparing digital images and videos, ready to be uploaded on websites, so as to be particularly advantageous to quickly capture large amounts of samples without the need for specialized personnel.

Another object of the present invention is to provide a device wherein the reciprocal movement of the capturing device with respect to the sample has up to three degrees of freedom.

Other objects and advantages of the invention will become apparent to those skilled in the art from the reading of the following text.

The objects described above are achieved by means of a device for photographing objects comprising a base to which a box-like body which can be opened is rotatably coupled, according to a horizontal axis, and housing inside the same a horizontal disc-shaped sample-holder, the latter being able to rotate about its vertical axis.

The rotation of the box-like body is independent of the rotation of the disc-shaped sample-holder and their kinematics allow both to rotate indefinitely around their axis, with the only limit imposed by the electrical connections.

An image capturing device such as a digital camera or camcorder is connected to the box-like body; lighting fixtures are also housed inside the box-like body.

A preferred embodiment provides that the box-like body has a spherical shape, with the horizontal axis of rotation being substantially diametrical; the box-like body includes an opaque, i.e. completely impervious to the light, outer shell, and an internal shell which is optically transparent. In this embodiment, both shells are substantially made as concentric hollow spheres, whose centre is located at the intersection of the horizontal axis of rotation of the box-like body with the vertical axis of rotation of the disc-shaped sample-holder; obviously, other forms of shells, not necessarily spherical, are possible. In addition, the inner shell can be made with screens suitable to diffuse the light from the lighting fixtures.

The gap between the outer shell and the inner shell houses said lighting fixtures; advantageously, the transparent inner shell can be made of a material suitable for spreading the light radiation.

According to a particularly advantageous embodiment, the box-like body comprises an equatorial belt to which a first fixed half-shell is solidly connected and to which a second mobile half-shell is reversibly connected. The latter can thus be removed from the diameter band to allow insertion of the sample inside the box-like body and to be then re-coupled to the equatorial belt in order to close the casing and make it impervious to light again; a simple and practical construction solution provides that the mobile half-shell is hinged to the diameter band and that there are closure means, for example of the magnetic type.

According to a preferred embodiment, the equatorial belt comprises two rotary passages, diametrically and coaxially aligned with the horizontal axis of rotation of the box-like body; the capturing device is also connected to the equatorial belt, in an intermediate position between the two loops, so that, when the box-like body rotates, the lens axis of the capturing device always lies on a vertical plane passing through the centre of the sphere.

According to a particularly accurate embodiment of the invention, the spherical box-like body comprises an outer counterweight, placed in a position diametrically opposed to that of the capturing device; the counterweight distance from the axis of rotation is adjustable so that it is possible to counterbalance capturing devices of different masses.

In order to automate the operation of the device, the rotary loops through which the box-like body is rotationally coupled to the base comprise motion transmitting means which, for example, can be actuated by an electric motor.

The rotating sample-holder disc, placed inside the box-like body, is made of transparent material; advantageously, the surfaces of said disc are treated in such a way as to be non-reflective.

Supporting means protrude from the inner surface of the equatorial belt to which, generally, at least three pulleys are rotationally coupled, according to vertical axes of rotation, in the grooves of which the perimeter edge of the transparent disc is received. Said pulleys are generally arranged according to a circumference.

The rotation of the transparent disc is induced by a second electric motor, and at least one of the rotary loops supporting the box-like body comprises means transmitting the motion from the motor to at least one of the pulleys with vertical axis supporting the transparent disc; the transmission of the motion from the pulley to the edge of the rotating disc is normally carried out by friction, but it can also occur with other known systems, such as toothed wheels.

A highly appreciated executive solution provides that the pulleys are realized by using rolling bearings with an outer perimeter groove, also referred to as "V" bearings, and that the efficiency of the friction motion transmission is improved by interposing rubber elastic gaskets between the pulleys and the edge of the transparent disc, inside the grooves of the same pulleys.

Also the transmission of the motion from the shaft of the second electric motor to the shaft of the driving pulley can be achieved by belt drive systems.

The capturing device is usually connected to the box-like body by means of a connection assembly comprising support elements of the capturing device.

According to a particularly complete embodiment of the invention, the camera coupling assembly can also be rotationally coupled to the box-like body, so as to allow the full rotation of the capturing device around the axis of its lens; this rotation can be controlled by a third electric motor.

By means of suitable motion transmission means, a fourth electric motor can actuate the mechanism which varies the focal length of the lens, a mechanism commonly known as "zoom"; this solution also has the advantage of ensuring the lens focal length stability even when it is facing downwards and the mass of its mobile portion tends to stretch the focal length, or vice versa, when the lens is facing upwards and the mass of its mobile portion tends to shorten the focal length.

Typically, all the electric motors used are of the stepper type and are actuated by the command and control system which supervises and manages the operation of the entire device, generally both for mechanical movements and for the management of lighting fixtures and for the capture and post-processing of digital images taken from a camera or a camcorder.

DETAILED DESCRIPTION OF A PREFERRED EMBODIMENT OF THE INVENTION

Figure 1:
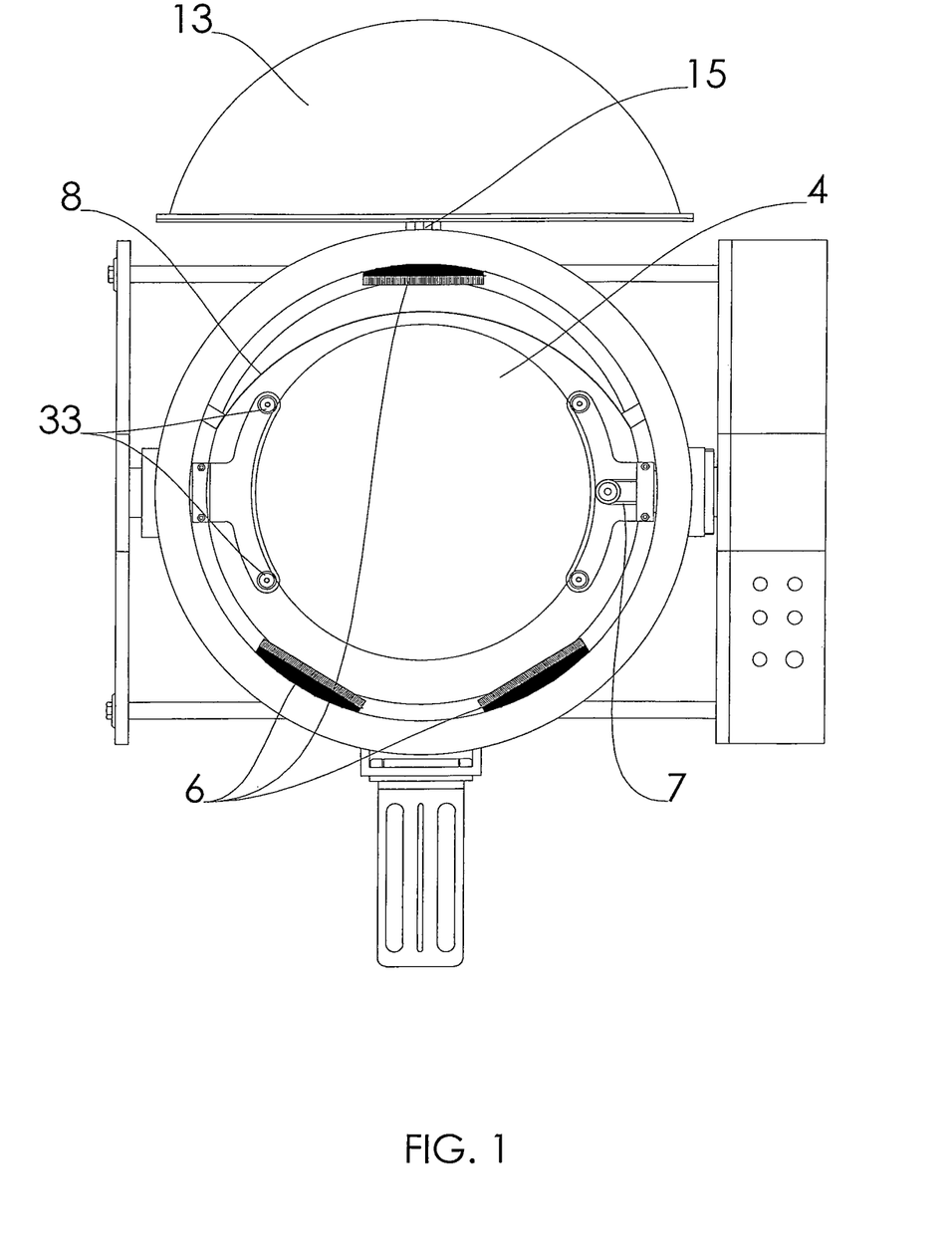
FIG. 1 shows a top view of an embodiment of the device object of the present patent application with the movable half-shell (13) in an open position thanks to the hinge (15). Inside the box-like body (1), it is possible to observe the sample-holder disc (4), LED lighting fixtures (6), an opaline-translucent screen (8) and pulleys (33), one of which is receiving a belt (7).
Figure 2:
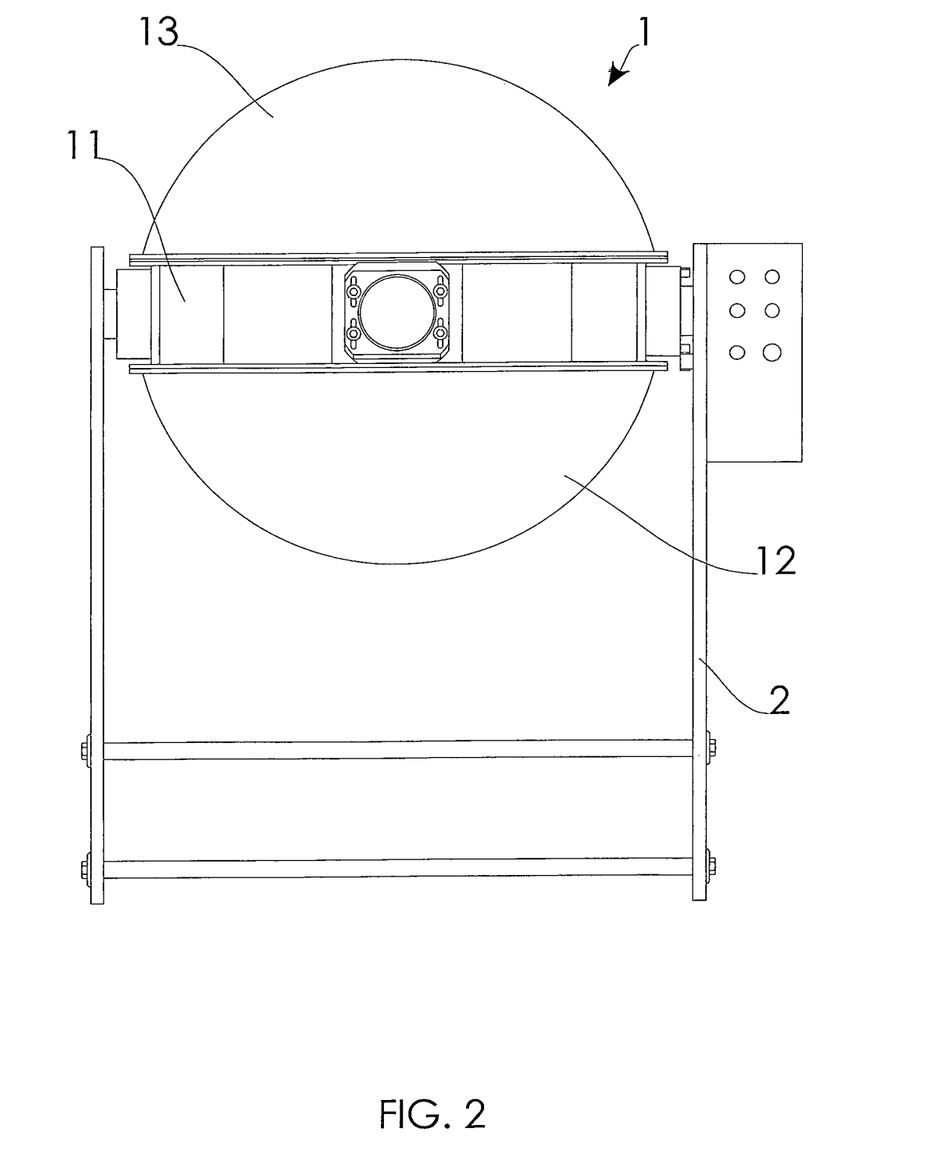
FIG. 2 shows a front view of the device of the preceding figure, in which it is possible to see the base (2) and the equatorial belt (11), as well as the movable half-shell (13) and the fixed half-shell (12) of the box-like body (1).
Figure 3:
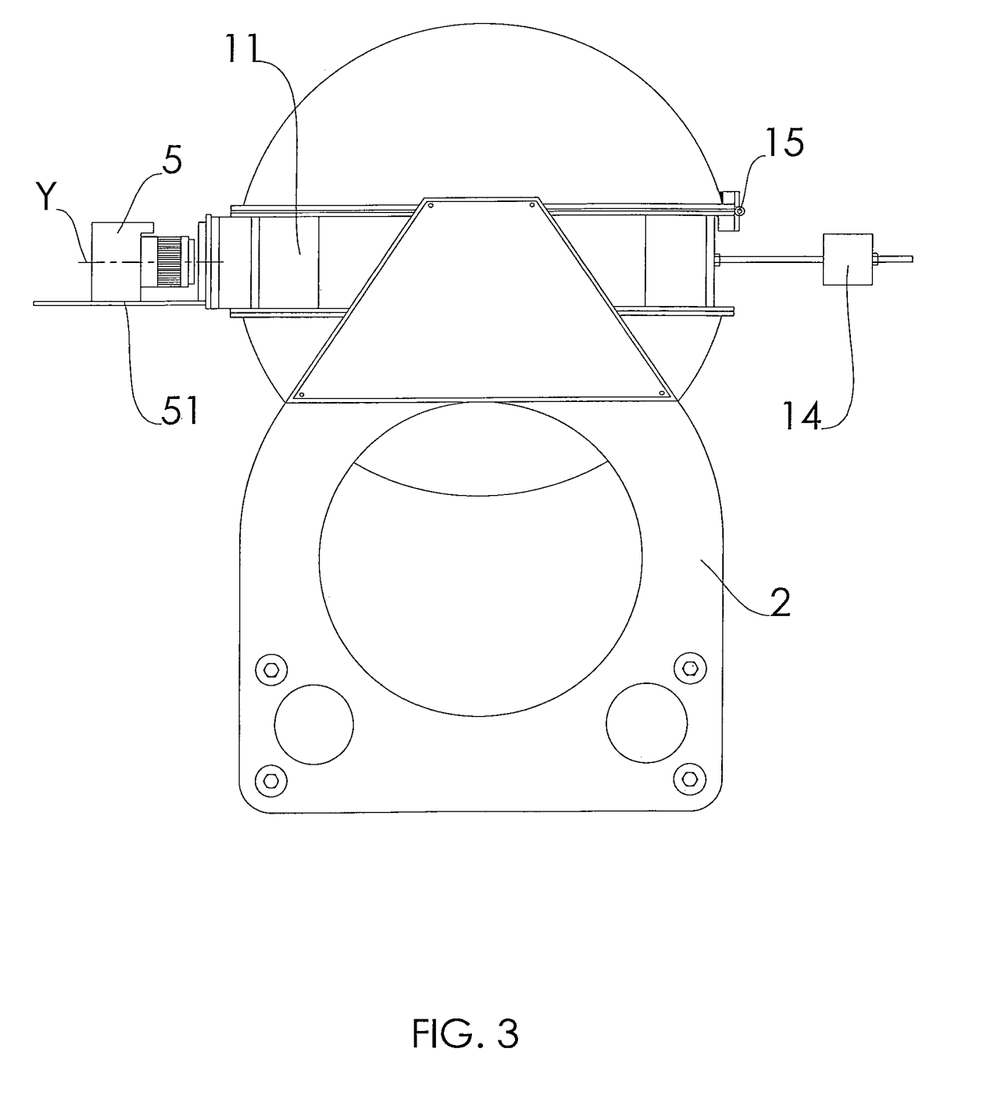
FIG. 3 shows a side view of the device of the previous figures in which the balancing counterweight (14) is in a diametrically opposed position to that of the capturing device (5), reversibly and solidly connected, for example via a screw, to a support (51). The latter, according to a particularly complete embodiment, is rotationally connected to the box-like body (1).
Figure 4:
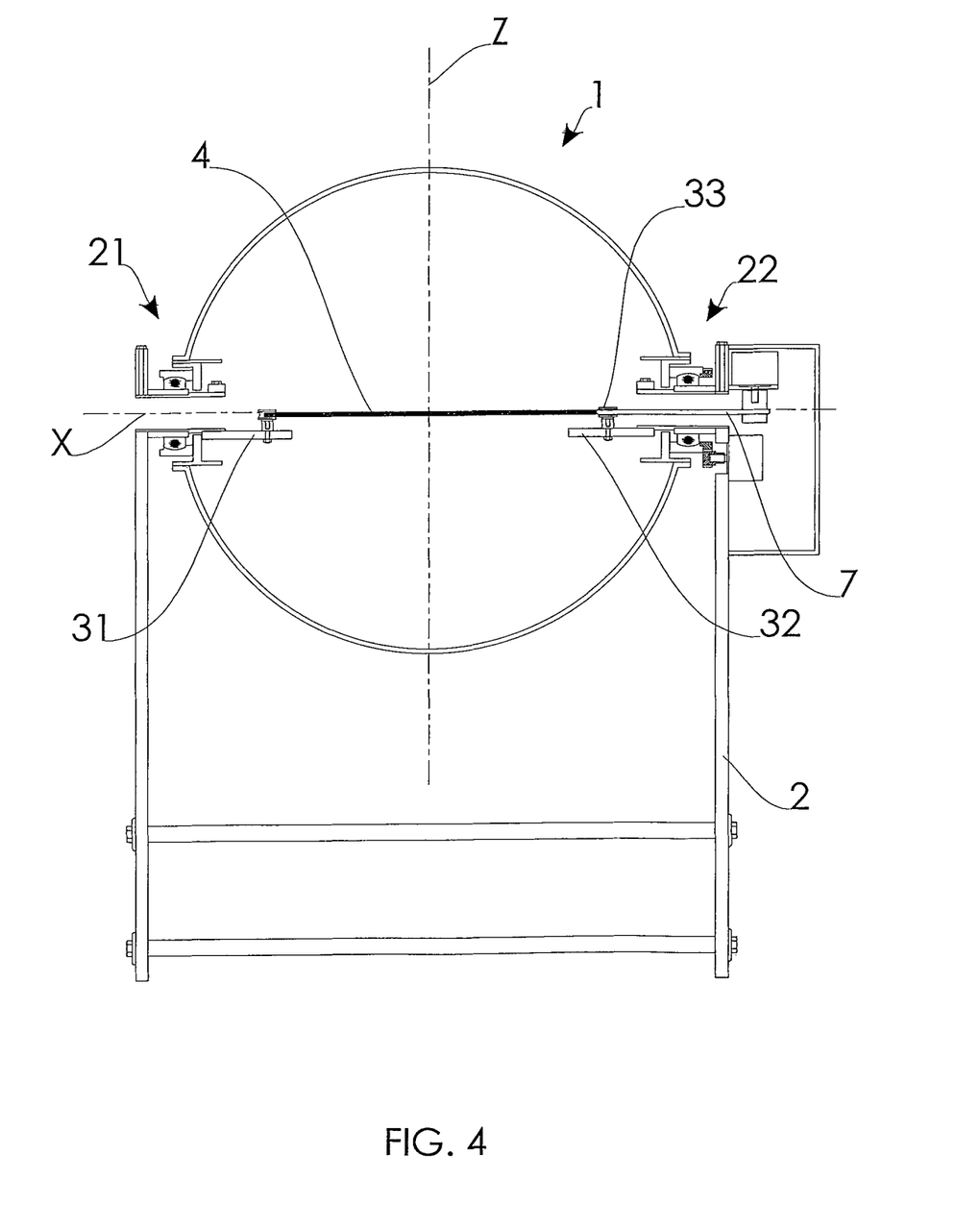
FIG. 4 shows a vertical section of the device of the previous figures in which it is possible to observe the two half shells of the box-like body (1) and the means for generating and transmitting the motion of the sample-holder disc (4) and of the box-like body (1). A motor with a horizontal axis drives a gear which actuates the rotation of the box-like body (1) according to the horizontal axis (X) and a vertical axis motor moves a belt (7) which, passing through one of the rotary loops (21, 22), drags a pulley (33); the latter actuates the rotation of said sample-holder disc (4) according to a vertical axis (Z). The drive pulley and the other free pulleys receiving the perimeter edge (41) of the sample-holder disc (4) are rotationally coupled to the inner portions (31, 32) of the support means.
Figure 5:
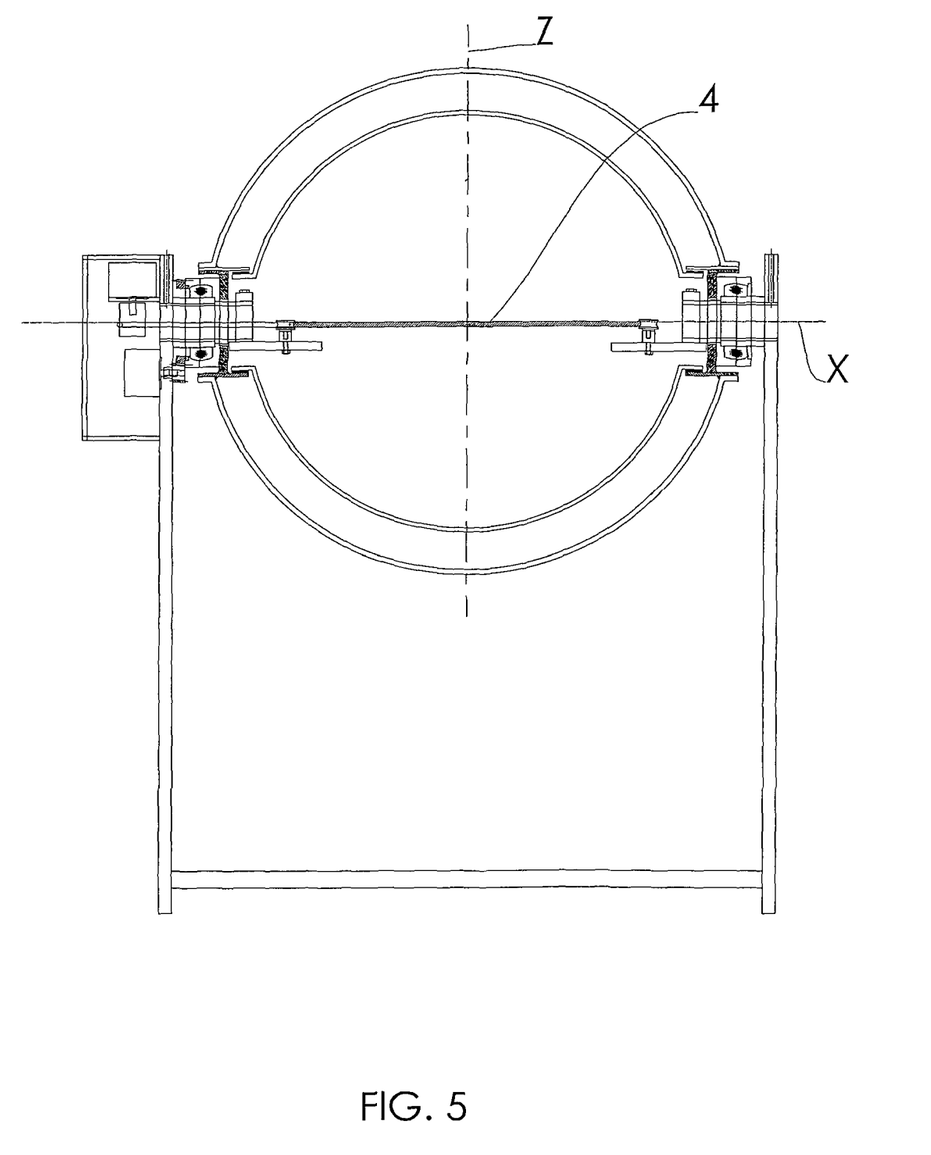
FIG. 5 shows a vertical section of a different embodiment of the invention in which each of the half shells comprises an optically opaque outer half-shell and an optically transparent internal half-shell.
Figure 6:
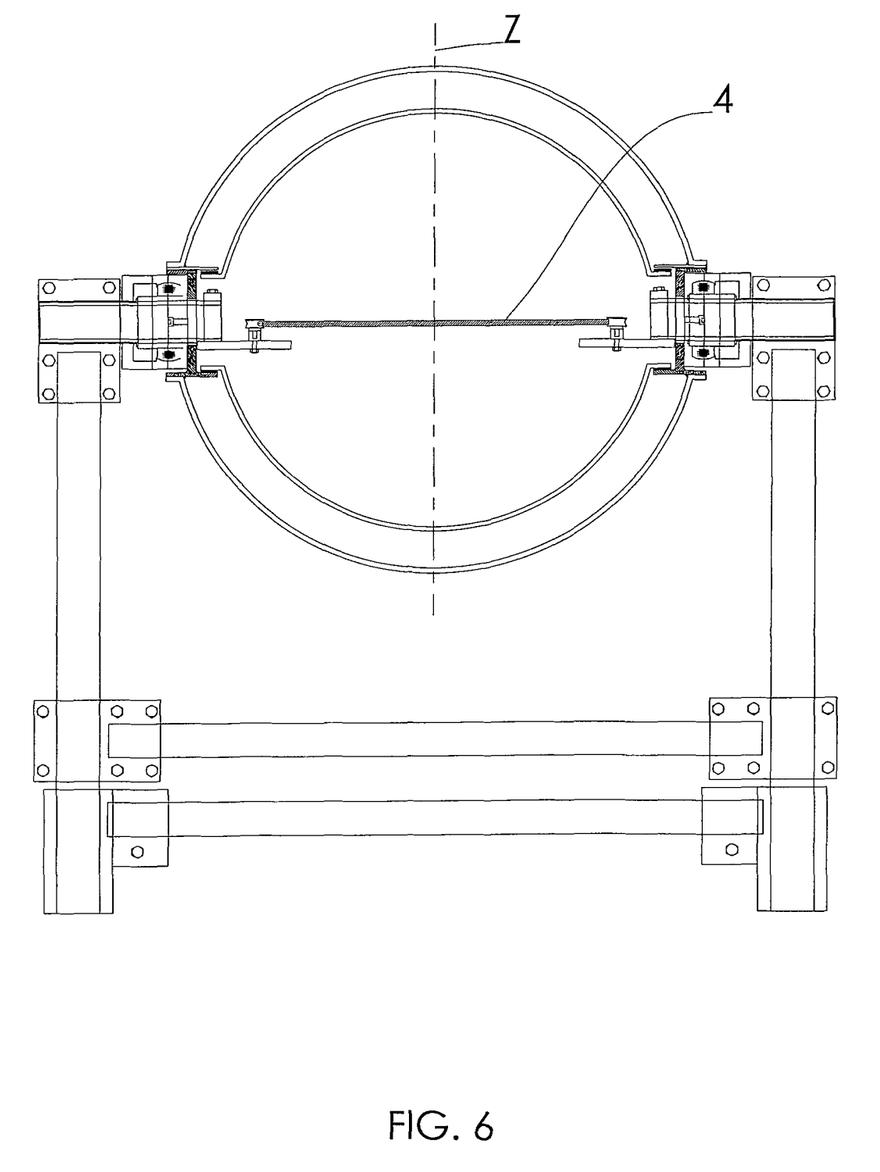
FIG. 6 shows a vertical section of an embodiment with manual handling and comprising inner half shells.

The device for photographing objects object of the present patent application comprises a box-like body (1) rotating about a horizontal axis (X), housing the lighting fixtures and a sample-holder disc (4) rotating around a vertical axis (Z). The capturing device (5) is fixed to the box-like body (1), the axis (Y) of the lens of which lies on a vertical plane and passes through the intersection point of the horizontal axis (X) and of the vertical axis (Z).

The box-like body (1) is configured as a sphere, which is suspended with respect to the base (2) by means of two rotary loops (21, 22) aligned according to the horizontal axis of rotation (X); therefore, the box-like body (1) can rotate indefinitely around its horizontal axis (X), with the only obvious limitation of the twisting of the electrical wiring, if the power is supplied with wires.

Therefore, the capturing device can take photographs of the sample from above, from both sides and from below; to make the sample visible even from the bottom, the sample-holder disc is made of transparent material, preferably treated to avoid reflection.

The rotation of the box-like body (1) takes place thanks to a stepper type electric motor and to a known type of motion transmission means such as toothed wheels or belts.

The rotary loops (21, 22) are crossed by respective supporting elements whose outer portions are solidly connected to the base (2), while the inner portions (31, 32) protrude inside the box-like body (1) and, according to respective vertical axes, elements (33) formed as pulleys, i.e., disc-shaped elements with a perimeter hollow on the outer surface are rotationally coupled to them.

The elements (33), often made with rolling bearings with outer groove, are arranged as a circumference and in their grooves the perimeter edge (41) of the sample-holder disc (4) is received; the rotation of the latter is completely independent of that of the box-like body (1) and occurs by the action of an electric motor transmitting the motion to at least one of the elements (33) by motion transmitting means, for example a belt, which pass through at least one of said rotary loops (21, 22).

The capturing device is connected to the surface of the box-like body and, in a particularly complete and performing embodiment, the present device further comprises means for rotating the capturing device with respect to the box-like body (1) according to the axis (Y) of its lens.

In the configuration shown in the figures, the box-like body (1) is shaped like a sphere with a substantially diametrical horizontal axis of rotation (X), the centre of which coincides with the point in which said horizontal (X) and vertical (Z) axes intersect; the box-like body (1) further comprises an equatorial belt (11) to which a first fixed half-shell (12) is solidly connected and to which a second movable half-shell (13) is reversibly connected to allow the access within the device.

The capturing device is rotationally connected to said equatorial belt (11) to which, in a diametrically opposite position, a balancing counterweight (14) is also connected.

The box-like body (1) comprises an optically opaque outer shell and an optically transparent inner shell; the lighting fixtures are housed in the gap between said inner shell and said outer shell. Advantageously, the transparent inner shell is made of a material suitable to diffuse the light. According to an economical and efficient solution, the lighting fixtures include LEDs (6), acronym for Light Emitting Diodes.

The invention claimed is:

1. Device for photographing and/or filming objects comprising an optically opaque box-like body (1) with a portion which can be opened and to which a capturing device (5) is connected, facing inwards where a sample-holder disc (4) is housed, which is made of optically transparent material and rotates about a vertical axis (Z), lighting fixtures being provided inside said box-like body (1), characterized in that said box-like body (1) is suspended with respect to a base (2) to which it is rotationally coupled according to a horizontal axis (X) by means of two rotary loops (21, 22); both of said loops (21, 22) being crossed by respective support means, each of which comprises a respective outer portion which is solidly connected to said base (2) and a respective inner portion (31, 32) protruding inside said box-like body (1) and to which one or more pulleys (33) are rotatably coupled according to vertical axes, the grooves of said pulleys receiving the perimeter edge (41) of said sample-holder disc (4), one or more pulleys (33) configured for transmitting motion to said sample-holder disc (4).

2. A device according to claim 1 characterized in that said vertical axis of rotation (Z) of said sample-holder disc (4) is incident with said horizontal axis of rotation (X) of said box-like body (1).

3. A device according to claim 1 characterized in that said capturing device (5) is at an equidistant position with respect to said two loops (31, 32) so that, during the rotation of said box-like body (1), the axis (Y) of its lens defines a vertical plane passing through the point of intersection of said horizontal axis (X) with said vertical axis (Z).

4. A device as in claim 1 characterized in that said capturing device (5) is rotatably connected to said box-like body (1) according to an axis coinciding with the axis (Y) of its lens.

5. A device as in, claim 1, characterized in that said box-like body (1) is shaped like a sphere with a substantially diametrical horizontal axis of rotation (X) and whose centre coincides with the point at which said horizontal (X) and vertical (Z) axes intersect.

6. A device according to claim 1 characterized in that said box-like body (1) comprises an equatorial belt (11) to which to a first fixed half-shell (12) is solidly connected and to which a second mobile half-shell (13) is reversibly connected.

7. A device as in claim 1, characterized in that said capturing device (5) is connected to said equatorial belt (11) to which, in a position diametrically opposed to that of said capturing device (5), a balancing counterweight (14) is also connected.

8. A device as in claim 1, characterized in that said box-like body (1) comprises an optically opaque outer shell and an optically transparent inner shell, and in that lighting fixtures are housed in the gap between said inner shell and said outer shell.

9. A device as in claim 1, characterized in that it comprises means for controlling the focal length of lenses of the zoom type with variable focus.

10. A device as in claim 1, characterized in that said pulleys (33) are made with rolling bearings with outer perimeter groove.

\* \* \* \* \*